US012340322B2

(12) United States Patent
Benson et al.

(10) Patent No.: US 12,340,322 B2
(45) Date of Patent: Jun. 24, 2025

(54) SMART TRIP PREAPPROVAL PREDICTION

(71) Applicant: COUPA SOFTWARE INCORPORATED, San Mateo, CA (US)

(72) Inventors: Dan Benson, San Clemente, CA (US); Choon Peck, Singapore (SG); Doug Benson, Burlingame, CA (US); Dawn Fink, Boise, ID (US); Alison Guilbeaux, Atlanta, GA (US); Valerie Layman, Seattle, WA (US)

(73) Assignee: Coupa Software Incorporated, Foster City, CA (US)

( * ) Notice: Subject to any disclaimer, the term of this patent is extended or adjusted under 35 U.S.C. 154(b) by 171 days.

(21) Appl. No.: 17/948,901

(22) Filed: Sep. 20, 2022

(65) Prior Publication Data

US 2023/0087215 A1 Mar. 23, 2023

Related U.S. Application Data

(60) Provisional application No. 63/247,251, filed on Sep. 22, 2021.

(51) Int. Cl.
*G06Q 10/02* (2012.01)
*G06Q 30/0283* (2023.01)
(52) U.S. Cl.
CPC ......... *G06Q 10/02* (2013.01); *G06Q 30/0283* (2013.01)
(58) Field of Classification Search
CPC ................ G06Q 30/0283; G06Q 10/02
See application file for complete search history.

(56) References Cited

U.S. PATENT DOCUMENTS 5,191,523 A 3/1993 Whitesage
6,009,408 A * 12/1999 Buchanan .............. G06Q 40/02
705/5

(Continued)

FOREIGN PATENT DOCUMENTS

WO 0154032 A2 7/2001
WO WO-2004070688 A1 * 8/2004 ............. G06Q 30/02

OTHER PUBLICATIONS

Gustafson, Per. "Managing business travel: Developments and dilemmas in corporate travel management." Tourism management 33.2 (2012): 276-284. (Year: 2012).*

*Primary Examiner* — Emmett K. Walsh
(74) *Attorney, Agent, or Firm* — Baker Botts L.L.P.

(57) ABSTRACT

One computer-implemented method comprises receiving requests to create subforms associated with a digitally stored expense trip preapproval form; in a particular subform, receiving input specifying input values for attributes of the particular subform, the plurality of input values collectively specifying the travel expense item; programmatically transmitting, to a price modeling server, a query comprising the input values and requesting a cost value for a travel item corresponding to the input values, and receiving a predicted cost of the travel expense item; automatically updating the particular subform to display the predicted cost and to populate the predicted cost into a total cost attribute, the total cost attribute being separate from the predicted cost; receiving an updated value of the total cost attribute and updating it; in response to determining that the updated total cost attribute differs from the predicted cost, presenting a notification specifying an amount of the difference.

14 Claims, 12 Drawing Sheets

(56) References Cited

U.S. PATENT DOCUMENTS

| | | |
|---|---|---|
| 8,694,346 B2 | 4/2014 | Crean et al. |
| 9,875,446 B2 * | 1/2018 | Hauviller ............ G06Q 30/0623 |
| 2003/0120526 A1 * | 6/2003 | Altman ................. G06Q 30/06 |
| | | 705/5 |
| 2014/0006067 A1 | 1/2014 | Rothley et al. |
| 2016/0148234 A1 | 5/2016 | Chavarria et al. |
| 2016/0247099 A1 | 8/2016 | Delaney et al. |
| 2021/0073921 A1 * | 3/2021 | Wang ....................... G06N 5/04 |

* cited by examiner

Enter Flight Details

[Add] ~302

Flight

306

*Departure City [                    ]
*Destination City [                    ]
*From [mm/dd/yy 📅]
            308
        310
*To [mm/dd/yy 📅]
                                            304
314    312 — ⦿ Round Trip  ○ One Way
— Predicted Pricing    0.00 USD
*Amount [0.00]    USD
                    316
Account  None 🔍

Enter Hotel Details

[Add]

Hotel

*Location [                    ]
*Check-in [mm/dd/yy 📅]
322  *Checkout [mm/dd/yy 📅]
— Predicted Pricing    0.00 USD
*Amount [0.00]    USD
Account  None 🔍

FIG. 3C 330

Enter Car Rental Details

[Add]

Car Rental

*Location [_____]
*Pick-up [mm/dd/yy 📅]
*Drop-off [mm/dd/yy 📅]
*Amount [0.00] USD
Account  None 🔍

FIG. 3D 340

Enter Train Details

[Add]

Train

*Departure City [_____]
*Destination City [_____]
*From [mm/dd/yy 📅]
*To [mm/dd/yy 📅]
⦿ Round Trip  ○ One Way
*Amount [0.00] USD
Account  None 🔍

| Orders | Invoices | Community | Payments | Inventory | Sourcing | Suppliers |

| Accounts | Users | Approvals | Budget Periods | Budget Lines |

Coupa Travel Preapproval - Response #6317 (Applied)

⚙ Coupa Predictive Pricing     *Powered by Comm*

Coupa Travel Preapproval     <u>502</u>

FLIGHT
- Departure City    San Francisco, CA, USA
- Destination City    London, UK
- From    06/07/20
- To    06/13/20     504
- ⦿ Round Trip   ○ One Way
- 506
- Predicted Pricing    1,300.00 USD     510
- 508 — Amount    1,500.00 USD (200 over Coupa Predicted Pricing of 1,300 USD)
- Account    Travel and Entertainment : Travel Expense 1-1-34-66040

HOTEL
- Location    London, UK
- 512 Check-In    06/08/20
- Check-Out    06/13/20
- Predicted Pricing    2,400 USD
- 514 — Amount    2,400 USD (Coupa Predicted Pricing of 2,400 USD)
- Account    Travel and Entertainment : Travel Expense 1-1-34-66040

OTHER
- Amount    600 USD
- Notes    Meals and Uber transportation
- Account    Travel and Entertainment : Other 1-1-34-66045

Total Requested    4,100 USD

✎ Approvers

FIG. 5B

| Coupa Travel Preapproval | 520 |

Requester
Chris Martini

FLIGHT

Departure City
San Francisco, CA, USA
Destination City
San Francisco, CA, USA
From
6/07/20
To
6/13/20
— 524

Round Trip
Yes
Predicted Pricing
1,300 USD — 526
Amount
1,500 USD (200 over Predicted Pricing) — 528, 530
Account
Travel and Entertainment : Travel Expense
1-1-34-66040

HOTEL

Location
London, UK
From
6/08/20
To
6/13/20
Predicted Pricing
2,400 USD
Amount
2,400 USD
Amount
Travel and Entertainment : Travel Expense
1-1-34-66040

Approvals — 540 — 2

Chris Martini
Submitted on 1/14/20 — 542

Ini - Uto Uko

SMART TRIP PREAPPROVAL PREDICTION

BENEFIT CLAIM

This application claims the benefit of provisional application 63/247,251, filed Sep. 22, 2021, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2020-2022 Coupa Software Incorporated.

TECHNICAL FIELD

One technical field of the present disclosure is computer-assisted decision support. Another technical field is automatic processing of electronic documents in a workflow.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In several different application areas, users create electronic documents, add data, and transmit the documents through a workflow or approval chain in which automated review and approval or manual review and approval occurs. With inefficient or repeated processes, significant human time, which comes at a cost, is lost thus creating a motivation for improved technology for process management. Computing resources, such as CPU cycles, network bandwidth, non-volatile storage and volatile memory, can be wasted or consumed in excess when a user creates an electronic document and submits it to a workflow when the document is assured of rejection because it fails to comply with policy, has invalid data, or contains data values that were obtained from inaccurate or incomplete external systems. The systems that process these electronic documents could be made more efficient, and would consumer fewer resources, if the systems could integrate computer-implemented processes to predict whether the document will be approved, or to suggest data values which, if entered in the document, would cause approval.

Large enterprises commonly pay or reimburse the cost of travel by employees that is necessary to support business operations. Travel costs typically are subject to budgets, caps, policies, or other controls. In present practice, employees commonly spend significant time trying to estimate travel costs from multiple suppliers and resources before submitting a request for preapproval of a proposed trip or planned trip. Further, employees may lack sufficient time or resources to submit a travel request with accurate cost guidance other than what is provided in policies or booking tools. Managers often have limited information, in the pre-travel stage, to accurately decide whether to approve a trip or to determine what costs or budget the trip will consume.

SUMMARY

The appended claims may serve as a summary of the invention.

BRIEF DESCRIPTION OF THE DRAWINGS

FIG. 3A illustrates a computer display device that is displaying a portion of a graphical user interface, in one embodiment.

FIG. 3B illustrates a computer display device that is displaying a portion of a graphical user interface, in one embodiment.

FIG. 3C illustrates a computer display device that is displaying a portion of a graphical user interface, in one embodiment.

FIG. 3D illustrates a computer display device that is displaying a portion of a graphical user interface, in one embodiment.

FIG. 5A illustrates a computer display device that is displaying a portion of a graphical user interface, and showing an example preapproval response in a desktop version, in one embodiment.

FIG. 5B illustrates a computer display device that is displaying a portion of a graphical user interface, and showing an example preapproval response in a mobile version, in one embodiment.

DETAILED DESCRIPTION

Figure 1:
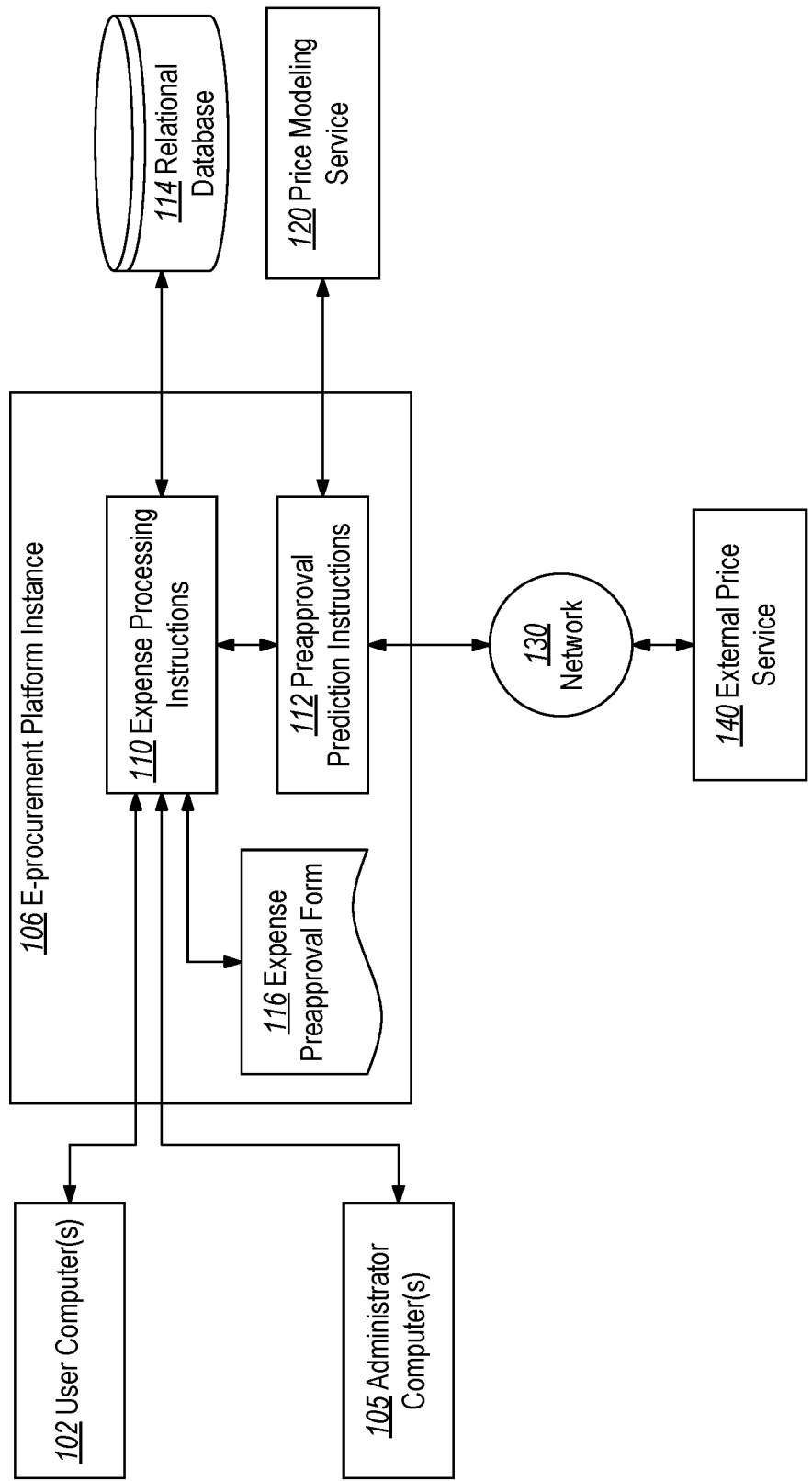
FIG. 1 illustrates an example distributed computer system with which an embodiment can be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are useful in automating certain travel expense recording and approval functions, especially in enterprises with large numbers of personnel, high travel spending amounts, and contracts with travel service providers to provide travel services at discounted rates or other special contract rates. For the purpose of illustrating a clear example, certain embodiments are described herein in the context of travel-related expenses, but other embodiments can be implemented in the context of expenses that are not related to travel but derive from other domains. Thus, all references herein to travel are examples and not intended as limitations.

In the travel domain, enterprises commonly find that employees spend significant time trying to estimate travel costs from multiple suppliers and resources before submitting a proposed travel plan or expense report for preapproval. "Preapproval," in this context, refers to an approval to incur certain expenses that is given or received before a trip or other event occurs in which the expenses are actually incurred. Preapproval is distinct from post-approval, in which an expense report of past incurred expenses is presented after a trip or other event, and then approved after the fact. Employees may also submit a travel request without accurate cost guidance, other than what is provided in enterprise policies or booking tools, based on lack of time and/or resources. Furthermore, managers typically have limited information at the pre-travel stage to make accurate decisions about potential budgetary impacts.

In an embodiment, an expenses trip preapproval form is defined in an enterprise e-procurement system. Instances of the form can be created, in any of a plurality of different subform types, and filled with data values relating to one or more travel items. The form can be programmatically integrated with one or more travel booking services, pricing services, or cost services that guide the user to select lowest-price travel items that match parameters entered in the subform. The subform also can be programmatically integrated with a price modeling service which, in response to a request containing parameter values for a travel item, returns suggested prices or costs for the travel item based on pre-negotiated contracts, schedules, or other policies of an enterprise. The subform is programmed to automatically compare the parameters that the user enters, and the proposed cost or price of one or more travel items, to the suggested prices or costs returned by the price modeling service, and to generate one or more notifications or alerts when the proposed cost or price of the one or more travel items exceed(s) the suggested prices or costs. If the proposed cost or price of the one or more travel items do not exceed the suggested prices or costs obtained from the price modeling service, then the subform can be automatically preapproved under computer control, and/or automatically satisfy one or more approval chain conditions, and/or routed to an approval chain having fewer approvers than when costs exceed the suggested costs. Furthermore, a final expense report that is linked to or associated with the subform can be automatically approved under program control, leading to fewer repetitive processes and greater efficiency.

Embodiments can provide the benefit of shared data between expense reimbursement systems and travel planning or booking systems. Employees can submit more accurate travel requests easily. Managers can be better equipped to approve or deny requests based on related budgets. Consequently, the data relating to travel and expenses that enterprises store can be more accurate and stored more efficiently.

In various embodiments, the disclosure encompasses the subject matter of the following numbered clauses:

1. A computer-implemented method executed using a server computer, the method comprising receiving from a user computer via a network one or more requests to create one or more subforms that are associated with a digitally stored expense trip preapproval form, each of the subforms being associated with a different type of a travel expense item; in a particular subform among the one or more subforms, receiving input from the user computer specifying a plurality of input values for attributes of the particular subform, the plurality of input values collectively specifying the travel expense item; programmatically transmitting, to a price modeling server, a query comprising the plurality of input values and requesting a cost value for a travel item corresponding to the plurality of input values, and receiving in response to the query a predicted cost of the travel expense item; automatically updating the particular subform to display the predicted cost in the particular subform and to populate the predicted cost into a total cost attribute of the particular subform, the total cost attribute being separate from the display of the predicted cost; receiving, from the user computer, an updated value of the total cost attribute and updating the total cost attribute to specify the updated value; in response to determining that the updated value of the total cost attribute is different than the predicted cost, automatically generating and displaying a notification specifying that the updated value is different and specifying an amount of difference between the updated value of the total cost attribute and the predicted cost.

2. The method of clause 1, the travel expense item being any of a flight, a hotel booking, a car rental booking, a train or rail booking, a bus or coach booking, allowable meal expenses, or any other associated expenses such as admission to paid events.

3. The method of clause 2, further comprising executing the programmatically calling the price modeling server only after determining that a set of the plurality of input values corresponds to a set of prequalifying conditions of the particular subform and locking one or more widgets of the particular subform.

4. The method of clause 1, further comprising automatically creating and storing, in digital database storage, a draft trip report and programmatically associating the expense trip preapproval form with the draft trip report.

5. The method of clause 4, further comprising automatically populating one or more expense lines of the draft trip report with the plurality of input values for attributes of the particular subform.

6. The method of clause 1, further comprising receiving from the user computer via the network at least two requests to create at least a first subform and a second subform that are associated with the expense trip preapproval form, each of the first subform and the second subform being associated with a different type of a travel expense item; in each of the first subform and the second subform, receiving input specifying a plurality of input values for attributes of the particular subform, the plurality of input values collectively specifying two respective travel expense items; using the plurality of input values of each of the first subform and the second subform, programmatically calling the price modeling server and receiving, in response to the calling, predicted costs of the travel expense items of each of the first subform and second subform; automatically updating the first subform and the second subform to display the predicted costs and to populate the predicted costs into a first total cost attribute of the first subform and a second total cost attribute of the second subform; receiving, from the user computer, an updated value of the first total cost attribute and updating the first total cost attribute to specify the updated value; in a graphical user interface comprising an approval view that shows values of the first subform and the second subform, in response to determining that the updated value of the first total cost attribute is different than a particular predicted cost in the first subform, automatically generating and displaying a first notification associated with the first subform and specifying that the updated value is different and specifying an amount of difference between the updated value of the total cost attribute and the particular predicted cost; in the approval view, generating and displaying a second notification associated with the second subform and specifying that the second total cost attribute is the same as a second particular predicted cost of the second subform.

7. The method of clause 1, the price modeling server comprising digitally stored database records for at least commercial air flight prices and hotel room prices, the price modeling server being programmed to continuously query third-party travel data services and update the database records.

1. Structural Overview—Example Distributed System

An embodiment can be used in a distributed computer system comprising components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Other arrangements may include fewer or different components, and the division of work between the components may vary depending on the arrangement.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

The drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of predicting likely cost(s) and variance(s) from cost policy associated with a travel expense report or a set of proposed travel expenses. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 illustrates an example distributed computer system with which an embodiment can be implemented. In an embodiment, one or more user computers 102 and one or more administrator computers 105 are communicatively coupled, directly or indirectly via one or more networks, to an e-procurement platform instance 106 and/or programmatically coupled to functional elements such as expense processing instructions 110 within. Each of the user computers 102 and administrator computers 105 can be any computing devices such as desktop computers, laptop computers, tablet computers, or smartphones. For purposes of illustrating a clear example, FIG. 1 shows single instances of user computers 102 and administrator computers 105, but practical embodiments can include thousands to millions of such computers depending upon the processing capacity of CPUs or other hardware resources of the e-procurement platform instance 106.

E-procurement platform instance 106 can comprise a set of executable program instructions, or units of instructions such as executables, binaries, packages, functions, methods, or objects that are hosted on one or more virtual computing instances of public datacenters, private datacenters, or cloud computing facilities. The e-procurement platform instance 106 can be programmed to execute enterprise procurement functions such as creating and managing requisitions, purchase orders, invoices, or other documents in digitally stored, electronic form. In an embodiment, e-procurement platform instance 106 is coupled to a relational database 114 that is programmed to store documents, metadata, configuration files, and other data for use in the functions of the e-procurement platform instance 106. While a relational database 114 is specified as an example, other embodiments can use any combination of large-scale digital data storage devices or systems, including object stores, flat file systems, or no-SQL databases, including any combination of those from SPARK, AMAZON S3, MICROSOFT AZURE, EMC, APACHE HADOOP, or others. A commercial example of e-procurement platform instance 106 is the COUPA Business Spend Management platform of Coupa Software Incorporated, San Mateo, California, but other embodiments need not implement every feature or function of Coupa.

In an embodiment, e-procurement platform instance 106 comprises expense processing instructions 110 that interoperate with preapproval prediction instructions 112 to facilitate the creation of one or more expense preapproval forms 116, which may be stored in the relational database 114. In an embodiment, preapproval prediction instructions 112 are programmatically coupled to price modeling service 120; for example, the preapproval prediction instructions can be programmed to call functions, methods, or application programming interfaces (APIs) of the price modeling service to retrieve price records from the service.

The expense processing instructions 110 and preapproval prediction instructions 112 are programmed to execute the functions that are described further in other sections of this specification, individually or with interoperation.

In an embodiment, preapproval prediction instructions 112 are coupled via network 130 to an external price service 140. Network 130 broadly represents one or more local area networks, wide area networks, internetworks, or a combination thereof, for packet-switched digital data communication of frames, packets, messages, and payloads. The external price service 140 can be a networked server of any entity that implements an API that the preapproval prediction instructions 112 can call. In an embodiment, external price server 140 accepts API calls, or parameterized HTTP GET requests, that contain or encode queries to retrieve then-current price data for specified elements of a travel plan. Examples of the elements include flights on airlines, hotel room reservations, rental car reservations, or other travel items. For example, preapproval prediction instructions 112 can formulate a query that comprises a start date, end date, and destination, submit the query to the external price service 140, and receive a result set of matching records identifying carriers, properties, rental companies, flights, properties, rates, and so forth.

For purposes of illustrating a clear example, a single e-procurement platform instance 106 is shown. Practical embodiments may be deployed with hundreds or thousands of such instances, each instance being associated with a different enterprise or entity. Instances can be concurrently executed using cloud-based datacenters and the relational database 114 can be implemented as a cluster of multi-tenant data repositories that serve different instances of different entities subject to security controls and data access controls that limit access of one entity to the data for only that entity.

Using the architecture of FIG. 1, as further described in other sections herein, user computer 102 can access e-procurement platform instance 106 and interoperate, via a browser or a local application or app on the user computer, with the expense processing instructions 110 to access expense preapproval form 116 and create one or more completed instances of preapproval forms of specified types. Completed instances of preapproval forms can be stored in database 114. As the user supplies input to complete data fields of one or more subforms that are associated with an expense preapproval form 116, expense processing instructions 110 are programmed to automatically call preapproval prediction instructions 112, which can call price modeling service 120 and/or external price service 140. A request to the price modeling service 120 can return expected prices for specified travel items or segments. A call to the external price service 140 can return then-current prices offered by travel service providers for specified travel items or segments that are not represented in price modeling service. Based on responses from the price modeling service 120 and/or external price service 140, one or more fields of the subforms can be automatically updated, and one or more notifications or alerts can be triggered if the user's proposed travel item does not conform to policy or exceeds prices represented in price modeling service 120. The one or more subforms can be persistently associated, in database 114, with an expense preapproval form 116. When the subforms are complete, the expense preapproval form 116 can be submitted, based on input from the user computer 102, for approval by one or more approvers using other user computers 102 or administrator computers 105.

Consequently, the architecture described herein can provide forecasts that are more accurate for the user computer 102 and more likely to be approved when the expense preapproval form 116 is submitted into an approval chain of one or more of the administrator computers 105 or other user computers. Therefore, the architecture and processes described herein offer more efficient use of computing resources by avoiding the creation, storage, and network communication of forms that cannot be approved or contain errors or omissions.

2. Functional Overview 2.1 Example Process Flow and User Interface Design

Figure 2:
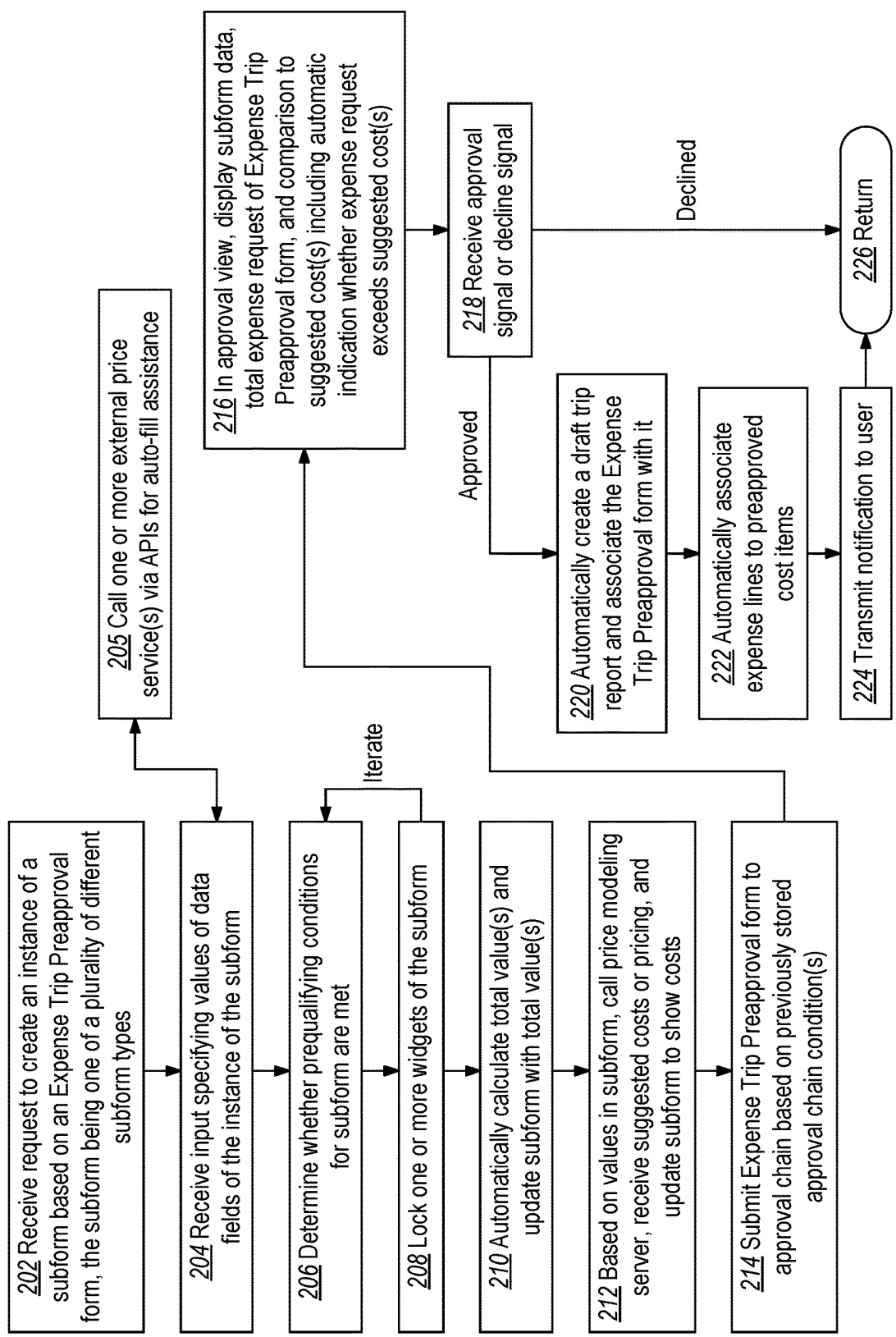
FIG. 2 illustrates a process flow or algorithm that can be programmed to implement aspects of an embodiment.

FIG. 2 illustrates a process flow or algorithm that can be programmed to implement aspects of an embodiment. Each flow diagram or written description of an algorithm herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

At block 202, the process of FIG. 2 is programmed to receive a request to create an instance of a subform based on an expense trip preapproval form, the subform being one of a plurality of different subform types. In some embodiments, an expense preapproval form 116 is created first, and user input from the user computer 102 selects and adds one or more subforms to the expense preapproval form based on the specific elements of a proposed trip, such as flights, hotel rooms, train trips, rental cars, or other elements. In this manner, block 202 can be programmed for receiving from a user computer via a network one or more requests to create one or more subforms that are associated with a digitally stored expense trip preapproval form, each of the subforms being associated with a different type of a travel expense item. In an embodiment, each expense trip preapproval form and subform(s) can be created under program control of expense processing instructions 110, which can be programmed to call create, read, update, delete (CRUD)-based operations or APIs of database 114 to create rows and update column attributes of the rows according to a table schema of the database. An object-oriented data model that can represent each expense trip preapproval form and subform(s), and a table schema that can be used for database 114, are described herein in other sections.

At block 204, the process is programmed to receive input specifying values of data fields of the instance of the subform. Thus, in a particular subform among the one or more subforms, the process is arranged for receiving input from the user computer specifying a plurality of input values for attributes of the particular subform, the plurality of input values collectively specifying the travel expense item.

To receive the input, as shown in block 205, the process can call one or more external price services, via APIs, to provide auto-fill assistance. At block 206, the process is programmed to determine whether one or more prequalifying conditions for the subform are met. If not, then in block 208, one or more widgets of the subform are programmatically locked so that they cannot be used until further input is received. These steps may repeat or iterate as input is received at block 204 until all prequalifying conditions for the subform are satisfied.

Thereafter, at block 210, the process is programmed to automatically calculate one or more total values and update the subform with the total values. Block 210 also can be performed after block 212.

At block 212, the process is programmed to call a price modeling server and based on the values in the subform to receive suggested costs or pricing, then update the subform to show the suggested costs or pricing. Thus, block 212 can be configured for programmatically transmitting, to a price modeling server, a query comprising the plurality of input values and requesting a cost value for a travel item corresponding to the plurality of input values, and receiving in response to the query a predicted cost of the travel expense item, and for automatically updating the particular subform to display the predicted cost in the particular subform and to populate the predicted cost into a total cost attribute of the particular subform, the total cost attribute being separate from the display of the predicted cost. In some embodiments, the process can involve receiving, from the user computer, an updated value of the total cost attribute and updating the total cost attribute to specify the updated value.

The price modeling server can comprise digitally stored database records for at least commercial air flight prices and hotel room prices, the price modeling server being programmed to continuously query third-party travel data services and update the database records. Or, the price modeling server can digitally store records for travel items, such as flights, hotel rooms, rental cars, trains, etc., that user accounts of the enterprise or entity, or others, previously booked and/or used. Thus, the price modeling server can store historic data records for travel items of one enterprise, or a community of entities, or receive periodic updates of offered prices or costs for the travel items from third-party data services. Examples of third-party services that can be queried as of the time of this writing include AMADEUS, SABRE, TRAVELPORT, FLIGHTLOGIC, EXPEDIA, RATEGAIN, MAKCORPS, HOTELBEDS, WEBBEDS, BONOTEL, RENTALCARS, CARTRAWLER, and others.

Blocks 202, 204, 206, 208, 210, 212 can be repeated any number of times to add two or more subforms to an expense trip preapproval form. Each travel expense item can be any of a flight, a hotel booking, a car rental booking, a train or rail booking, a bus or coach booking, allowable meal expenses, or any other associated expenses such as admission to paid events.

and different subforms can have different types corresponding to different kinds of travel items.

At block 214, the process is programmed to receive input to submit an expense preapproval form 116 with the subform to an approval chain, based on one or more previously stored approval chain conditions. At block 216, the process is programmed to display, in an approval view, subform data, the total expense request of the expense preapproval form with data for each subform, and a comparison to suggested costs including an automatic indication, alert, or notification whether the expense request exceeds the suggested costs.

The notification of block 216 can be rendered and displayed visually near data values for each subform of multiple different subforms that are associated with the expense preapproval form. The content of a notification can differ depending on whether a predicted cost is greater than, less than, or the same as the total cost stated in the subform. For example, the process can be programmed, in a graphical user interface comprising an approval view that shows values of a first subform and the second subform, in response to determining that the updated value of the first total cost attribute is different than a particular predicted cost in the first subform, for automatically generating and displaying a first notification associated with the first subform and specifying that the updated value is different and specifying an amount of difference between the updated value of the total cost attribute and the particular predicted cost, and generating and displaying a second notification associated with the second subform and specifying that the second total cost attribute is the same as a second particular predicted cost of the second subform.

At block 218, as part of the approval chain, the process is programmed to receive an approval signal or decline signal based on action by one or more approvers in the chain. If the expense preapproval form is declined, then at block 226 the process completes. In some embodiments, the process returns control to another system, process, program, or other functional element, if the process of FIG. 2 was invoked through such an element. If the expense preapproval form is approved, then control transfers to block 220 at which the process is programmed to automatically create a draft trip report and programmatically associate the expense preapproval form with the trip report. Block 220 can comprise creating rows in tables of database 114 to represent the draft trip report with column attributes that point to another row of another table that represents the expense preapproval form. Further, at block 222, the process is programmed to automatically associate one or more expense lines of the trip report to one or more corresponding preapproved cost items. Again, column attributes of database tables can be used, and other sections of this description show a data model and table schema that can be used.

At block 224, in some embodiments, the process is programmed to transmit a notification to a user computer 102 specifying that expense preapproval form was approved and that the draft trip report has been created. The notification can include a hyperlink which, when invoked via user input, directs the user computer 102 to the draft trip report and causes rendering and/or displaying the draft trip report at the user computer.

In some embodiments, FIG. 2 is implemented using expense processing instructions 110 and preapproval prediction instructions 112 executing in e-procurement platform instance 106, thus, on the server side of a client-server relationship of the user computer 102 to the platform instance. Additionally or alternatively, one or more elements of the logic of FIG. 2 can be implemented on the client side, using browser-executed code like JAVASCRIPT in a browser of the user computer 102, or using a special-purpose application or app hosted on the user computer. When client-side elements are used, communication between the app and the e-procurement platform instance can use an application-specific protocol layered on HTTP, parameterized HTTP, and/or HTML that is dynamically generated on the server side and transporting JAVASCRIPT or other browser-executable code.

2.2 Example Visual Implementation

The preceding section has explained an example programmed process at a high level to focus on the principal functional operations of an embodiment. This section describes one possible implementation that could be programmed as part of a larger travel planning system, expense reporting system, and/or e-procurement system. In one embodiment, a new form of the type Expense Trip Preapproval is created, corresponding to an expense preapproval form 116 (FIG. 1). For example, in Coupa, the Setup>Platform>Forms function can be used to create the new form type. In a Form Attributes section, the Expense Trip Preapproval form type can comprise: standard fields for the form framework, such as the ability to support custom fields; a digital image comprising a banner; an Auto Approve attribute that is not enabled; and an Auto Apply attribute that is enabled. The form may have, as required fields, a form description and a total amount requested. The form description can be visually presented, in other operations, as a title of a trip preapproval. The total amount requested can be a non-editable amount field which, in other operations, reflects the sum of the subform amount value.

In an embodiment, system subform types include Flight, Hotel, Car Rental, Train, and Other. FIG. 3A illustrates a computer display device that is displaying a portion of a graphical user interface, in one embodiment. FIG. 3B illustrates a computer display device that is displaying a portion of a graphical user interface, in one embodiment. FIG. 3C illustrates a computer display device that is displaying a portion of a graphical user interface, in one embodiment. FIG. 3D illustrates a computer display device that is displaying a portion of a graphical user interface, in one embodiment.

Referring first to FIG. 3A, it shows an example visualization of a Flight subform 300 as rendered in a graphical user interface of the user computer 102 to facilitate entry of flight details for a proposed flight. An Add button 302 can be programmed to submit or POST a parameterized HTTP request or other programmatic call to the expense processing instructions 110 to cause storing an instance of a subform with all data entered in all other fields of FIG. 3A in the database 114. A departure city field 306 is programmed to receive input to specify a departure location of a flight and a destination city field 308 is programmed to receive input specifying a destination of a flight. Fields 306, 308 may be programmed to automatically call an external service to auto-populate the fields with values based on limited input. For example, fields 306, 308 can be programmed to receive one or more characters of input from user computer 102 and as the input is typed, to call an external geographic information service to populate the field with matching cities in a canonical format, then receive input specifying a user selection of a matching city value or a desired city value. For example, the GOOGLE PLACES API can be called.

Figure 4:
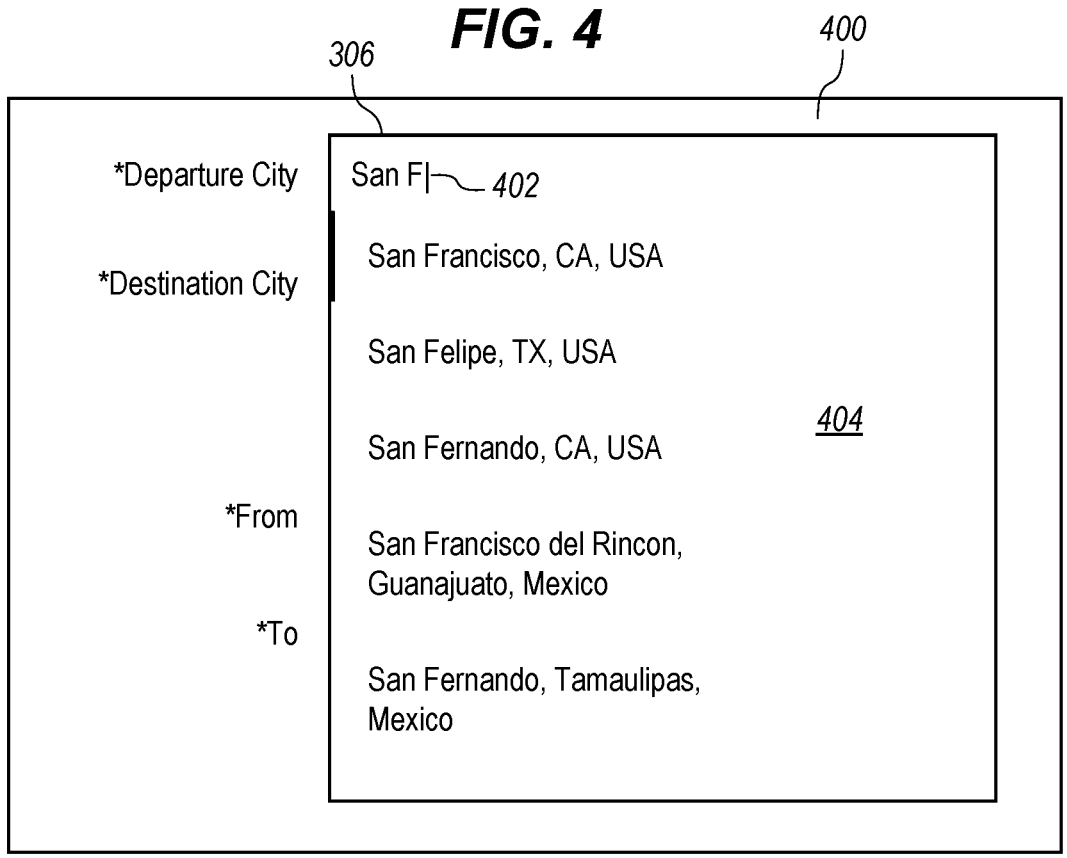
FIG. 4 illustrates a computer display device that is displaying a portion of a graphical user interface, and showing a portion of an example autofill function, in one embodiment.

FIG. 4 illustrates a computer display device that is displaying a portion of a graphical user interface, and showing a portion of an example autofill function, in one embodiment. In the example of FIG. 4, input from user computer 102 in departure city field 306 comprises "SAN F" as shown by input 402. In response, the subform 300 has called an external service, provided "SAN F" in a call to the service, and received a result set of matching responses, which are rendered and displayed as a list 404 of possible destinations. Further input from user computer 102 then selects a matching result item to populate the field 306.

Date picker fields 310 are programmed as required fields to receive start and end dates of a proposed flight. A trip type radio button 312 is programmed to accept selections of a Round Trip type or One Way type. In an embodiment, fields 306, 308, 310, 312 are required fields; in an embodiment, in response to receiving valid data values in all such fields, the subform 300 is programmed to lock those fields to block subsequent input, display a visual spinner or other interstitial visualization to cue the user computer that the system is processing the data. Form 300 further comprises a predicted pricing value 314, and the form is programmed to automatically call the price matching service 120 and/or external price service 140, based on values in the preceding fields, and receive in response a likely price, known price, or other predicted price for a flight based on the values in the other fields. In some embodiments, the price matching service 120 is programmed to use the closest airport and economy prices when determining price forecasts. In some embodiments, the price matching service 120 is programmed to use standard room rates at hotels when determining price forecasts for hotels. When the call yields a response, the form 300 is updated automatically to show the predicted pricing as value 314. A response can include zero result values and can cause subform 300 to generate and display an error message or notification specifying that predicted pricing is unavailable.

Subform 300 also comprises an editable amount field 316 that is automatically filled with the same value as for predicted pricing value 314 when a response to the call is received. However, being editable, the amount field 316 can receive changes or overriding values from user computer 102 to adjust the proposed amount for the flight. An account selector also can be provided to associate the form 300 with an expense account.

In some embodiments, subform 300 is programmed to condition making the call to the price matching service 120 and/or external price service 140 on receiving values for a specified set of required fields, termed prequalifying conditions. The specific required fields can vary for different types of subforms. For example, a Flight subform can require entry of departure city, destination city, start and end date values, and trip type. A Hotel subform can require entry of location, check-in date, and check-out date values.

In an embodiment, if one of the prequalifying condition fields is changed, then the subform 300 is programmed to automatically call the price matching service 120 and/or external price service 140, based on the updated values in the preceding fields, and receive in response an updated likely price, known price, or other predicted price for a flight based on the updated values in the other fields. When the call yields a response, the form 300 is updated automatically to show updated predicted pricing as value 314, and to update amount field 316 even if that field had previously received overriding input from the user computer 102.

Referring now to FIG. 3B, it shows a Hotel subform 320 as rendered in the GUI of the user computer 120. A Hotel type subform 320 can include a location field that calls the geographical information service described above to support the selection of a canonical value of a city or other location within the field. Subform 320 can comprise required date picker fields for check-in and departure dates, and a predicted pricing field 322 that is updated automatically based on a response to a call to the price matching service 120 and/or external price service 140, based on values in the preceding fields.

FIG. 3C shows a Car Rental subform 330 as rendered in the GUI of the user computer 120. FIG. 3D shows a Train subform 340 as rendered in the GUI of the user computer 120. The subforms 330, 340 may be programmed in the same manner as described for FIG. 3A, FIG. 3B, with required data input fields for location or cities, as appropriate, start and end dates, and trip type if appropriate. Each of the subforms 330, 340 also is programmed with an amount field in which user computer 102 can supply the estimated cost of a car rental or train trip based on information available to the user computer. Thus, the use of a predicted price field or value is not required in some embodiments. In other embodiments, depending on the data available in the price matching service 120 and/or external price service 140, the subforms 330, 340 can be programmed to call the services to obtain predicted pricing for car rentals or train trips based on the data entered in the required fields of the forms and to display a predicted price value near the amount fields of the forms.

Furthermore, in some embodiments, a subform of type Other can be provided having a visual appearance and data entry fields similar to FIG. 3A, FIG. 3B, FIG. 3C, FIG. 3D, for travel items or segments other than the types of the other subforms that have been described. In one embodiment, the Other subform type comprises an amount field that is programmed to receive input from user computer 102 for items such as meals and other expected costs of a trip, a notes field that is programmed to receive text field input for notes concerning an amount, and an optional account selector field.

FIG. 5A illustrates a computer display device that is displaying a portion of a graphical user interface, and showing an example preapproval response in a desktop version, in one embodiment. FIG. 5A shows a preapproval form that has been populated with values for three (3) subforms for a flight, hotel, and other, and submitted into an approval chain. Thus, FIG. 5A represents a data display that the expense processing instructions 110 generate and display to an approver, in the approval chain, after a user computer has prepared multiple subforms and requested approval.

In an embodiment, an approval graphical user interface (GUI) 500 comprises a form summary panel 502 that reproduces the data that the user computer 102 entered for one or more items for which preapproval is requested. In the example of FIG. 5A, a Flight subform 300 was prepared and submitted with values 504 for cities, dates, and trip type, resulting in generating and adding a predicted pricing value 506. In this example the user computer 102 also provided an updated amount value 508 of "1500" compared to the predicted pricing value 506 of "1300." The expense processing instructions 110 are programmed to automatically detect that "1500" is greater than "1300" and to generate and display, as part of panel 502, a notification message 510. The notification message can be programmed to specify a difference of the amount value 508 as compared to the predicted pricing value 506 and to include an alert 510 concerning an overage or shortfall. In some embodiments, if the values are the same, then the notification can be neutral. For example, for the Hotel item of FIG. 5A, the predicted pricing value 512 is "2400" and the amount field 514 also is "2400", so the notification message states the predicted pricing and does not include "over".

The "Total Requested" field in panel 502 can be non-editable and is programmed to show a sum of the subform amount values. In the example of FIG. 5A, the Total Requested value of "4100" is the sum of 1300, 2400, and 600. The Submit for Approval button always remains active. Subforms can be programmed with error messages if all the required fields have not been entered and/or amounts for flight, hotel, or other have not been entered at the time that the Submit for Approval is selected.

FIG. 5B illustrates a computer display device that is displaying a portion of a graphical user interface 520, and showing an example preapproval response in a mobile version, in one embodiment. Thus, FIG. 5B represents a view of the data of FIG. 5A as visualized using a mobile computing device of an approver. A mobile device GUI 520 can be programmed to show data values 524 for a Flight subform 300 and other forms that have been submitted for preapproval. In an embodiment, the mobile device GUI 520 further comprises a predicted pricing value 526 and an amount value 528. When the amount value 528 is greater than the predicted pricing value 526, the mobile device GUI 520 is programmed to display a notification message 530 specifying that the amount value 528 exceeds the predicted pricing value and the difference. Furthermore, the mobile device GUI 520 can include a section 540, which can be visible when scrolling the GUI 520, and comprising an approval chain panel 542 that identifies one or more approvers.

Figure 6:
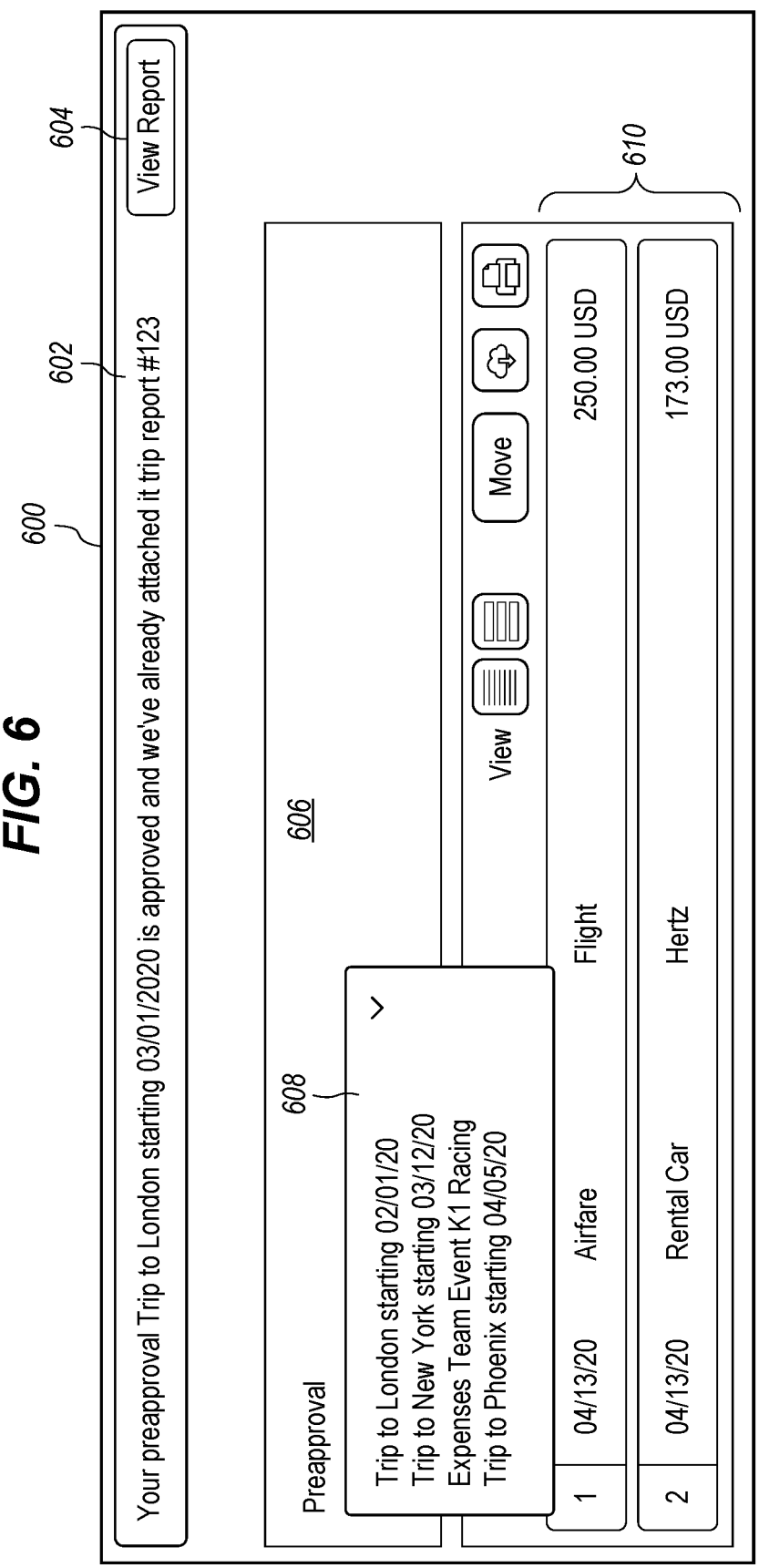
FIG. 6 illustrates a computer display device that is displaying a portion of a graphical user interface, and showing a portion of an example user notification and user report, in one embodiment.

In an embodiment, when a preapproval request as shown in FIG. 5A, FIG. 5B completes approval by all approvers in the approval chain, the expense processing instructions 110 are programmed to automatically create and store a draft trip report in database 114, and associate, with the draft trip report, an expense preapproval form 116 based on a plurality of subforms. FIG. 6 illustrates a computer display device that is displaying a portion of a graphical user interface, and showing a portion of an example user notification and user report, in one embodiment. In the example of FIG. 6, the expense processing instructions 110 have been programmed to generate and cause displaying a graphical user interface 600 having a notification message 602 and a button widget 604. In an embodiment, the notification message 602 specifies that an expense preapproval form 116 has been approved and has been attached to or associated with a trip report. The button widget 604 is programmed to cause displaying the trip report in response to input selecting the button widget. GUI 600 further comprises a preapproval panel 606 with a pull-down widget 608 and one or more expense lines 610. In an embodiment, the pull-down widget 608 is programmed to receive input specifying a selection of a particular trip report from among a plurality of different trip reports that have been previously stored in database 114 and that are associated with an account of the then-current user or user computer 102. The expense processing instructions 110 are programmed to automatically create and store expense values in expense lines 610.

FIG. 3A shows an account selector with which an account, of an enterprise accounting system or entity accounting system, can be associated with a subform such as subform 300. In an embodiment, the account selector comprises a graphical widget that is programmatically linked to a table or list of charge accounts that an enterprise or entity maintains for tracking travel expenses or other expenses. Flight, Hotel, Car Rental, Train, or Other subform types can include an account selector. In an embodiment, data entry using the account selector is not required. In some embodiments, each user account of a user of a user computer 102 can be configured with a default accounting string that the expense processing instructions 110 automatically populate into the account selector when a subform is accessed or created. In an embodiment, if a user account has no default accounting string configured, then the expense processing instructions 110 are programmed to search a table or list in database 114, or other data storage, of account names to determine if a related category account default can be populated in the account selector. For example, based on the subform type, search queries can be submitted to database 114 or other storage to retrieve accounting categories based on keywords such as flight, airfare, hotel, lodging, car rental, rental car, train, transport, or other keywords. If the user account has no default accounting string and search queries do not yield matching category values, then the account selector can be blank and optionally updated in response to input from user computer 102.

Figure 7:
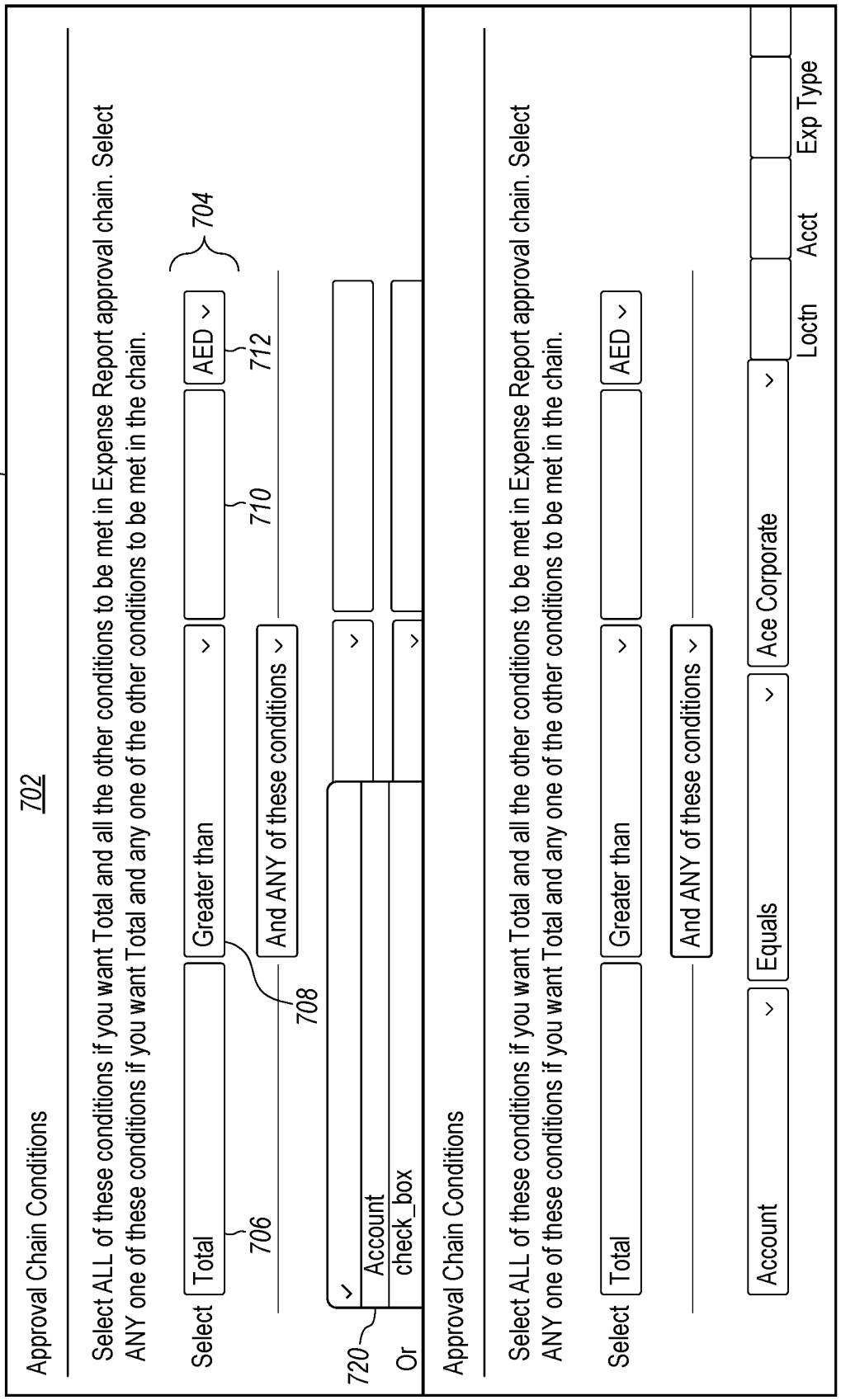
FIG. 7 illustrates a computer display device that is displaying a portion of a graphical user interface, and showing a portion of an example approval chain condition interface, in one embodiment.

When account values are present based on using the account selector widget, account values can form conditions within approval chains. FIG. 7 illustrates a computer display device that is displaying a portion of a graphical user interface, and showing a portion of an example approval chain condition interface, in one embodiment. In the example of FIG. 7, an approval chain GUI 700 comprises an approval chain conditions panel 702. User input from user computer 102 can specify a Total attribute 706 of an expense report, an operator 708 such as Greater Than, a numeric value in a value field 710, and a currency identifier using a currency pull-down widget 712. Collectively, these values form an approval chain condition 704 that can be one of many approval chain conditions. While FIG. 7 shows the Total attribute as the basis of the approval chain condition 704, in an embodiment, an Account attribute 720 can be selected and used in the same approval chain condition or a different approval chain condition. Such an approval chain condition can be configured to require that the Account attribute 720 of the account selector of the subform 300, or another subform, must match a value specified in the approval chain condition. Therefore, an expense preapproval form 116 can be associated with approval chain conditions that require subform 300 or other subforms to specify a particular account or be rejected. Programming with this process enables an entity to enforce accounting controls on the subforms, and ultimately on the expense preapproval form 116, automatically without human involvement. The result is more efficient storage and network transmission of data because the process of the present disclosure precludes the creation or submission, in approval chains, of subforms or expense preapproval forms 116 that cannot be approved based on incorrect or missing account values.

2.2 Example Object-Oriented Programming Implementation

Figure 8:
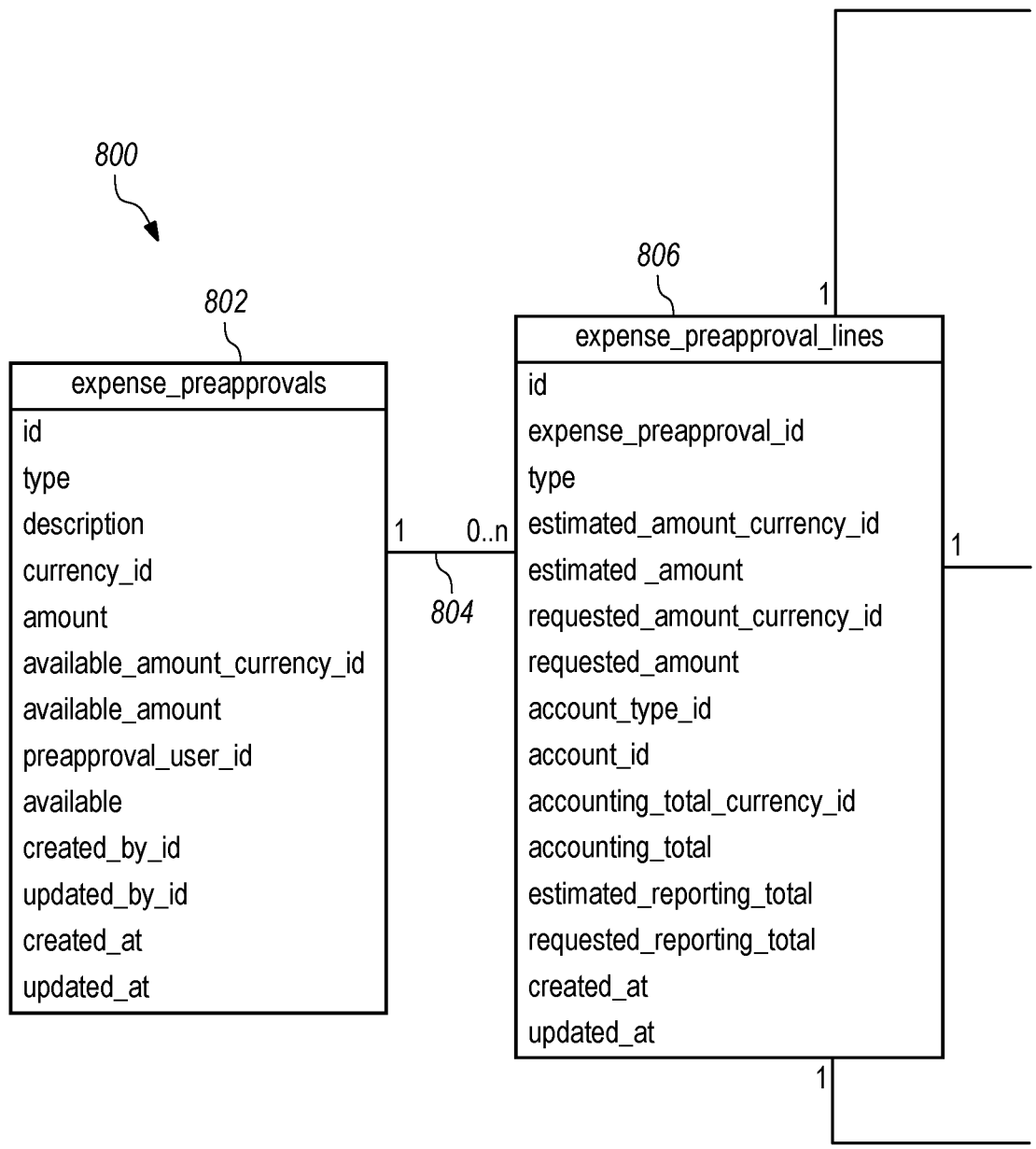
FIG. 8 illustrates an example data model that can be used in programming an embodiment.

FIG. 8 illustrates an example data model that can be used in programming an embodiment. FIG. 8 can serve as a roadmap for programming a data schema of database 114 for the expense preapproval form 116. In an embodiment, a table schema 800 comprises an expense_preapprovals table 802 having a plurality of rows each defining an expense preapproval form 116 and having column values for a row identifier value, type, description, currency, amount, available amount, user identifier, creator identifier, updater identifier, creation time, and update time. Each row of the expense_preapprovals table 802 is associated with, as indicated by link 804, zero or more expense_preapproval_lines rows 806 of an expense preapproval lines table. Each of the rows 806 comprises column values for row identifier, a pointer back to the corresponding expense preapproval row, type, estimated amount and currency, requested amount, account details, and accounting values for totals, a reporting estimate value, and a requested reporting total value. Creation time and update time can be included. The values of a line can vary based upon enterprise accounting practices.

A data model such as that of FIG. 8 can be backed by data persistence logic programmed as part of the expense processing instructions 110. Individual travel segment specific data such as the estimated amount, requested amount, etc. can be stored in the expense_preapproval_requests model. The type field can be Flight, Hotel, Car Rental, etc. For other expenses, a general expense preapproval request can be stored in expense_preapproval_requests with the type field set to null. Each record in expense_preapproval_requests can have a corresponding entry in flight_requests, hotel_requests or car_rental_requests; these models can capture the search criteria that user computer 102 provided in the corresponding subforms.

Figure 9:
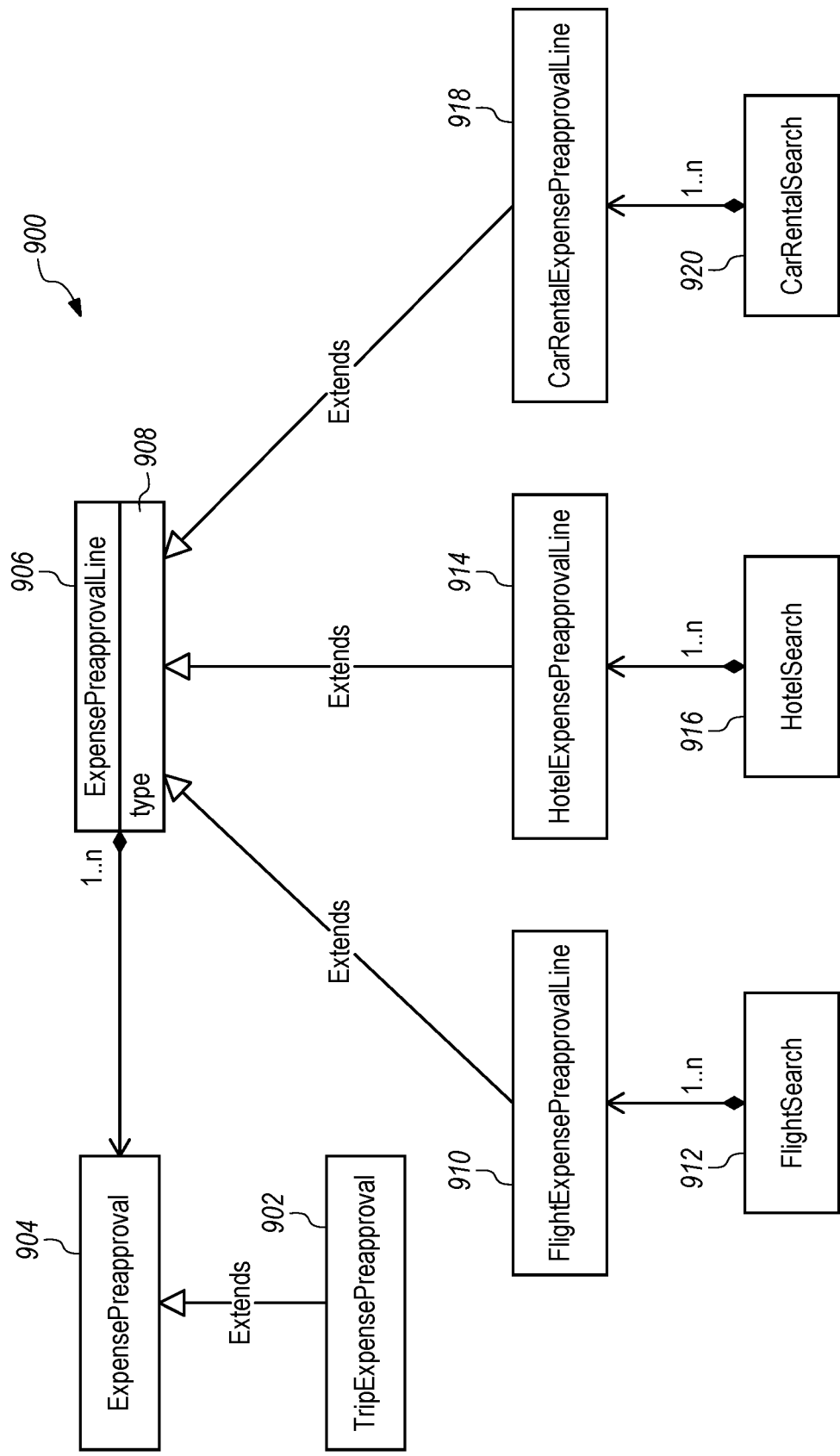
FIG. 9 illustrates an example class diagram that can be used to program an embodiment using object-oriented programming languages and techniques.

FIG. 9 illustrates an example class diagram that can be used to program an embodiment using object-oriented programming languages and techniques, consistent with the foregoing description. A TripExpensePreapproval class 902 can extend an Expense_Preapproval class 904 and have pointers from one or more objects of an ExpensePreapprovalLine class 906, each having a particular type attribute 908 corresponding to Flight, Hotel, Car Rental, etc. Type-specific expense lines can be represented using objects of a FlightExpensePreapprovalLine class 910, HotelExpensePreapprovalLine class 914, and CarRentalExpensePreapprovalLine class 918, which extend the ExpensePreapprovalLine class 906. Search objects that have been populated based on subforms can be represented using a FlightSearch class 912, HotelSearch class 916, and CarRentalSearch class 920, each of which is an attribute of objects of the corresponding classes 910, 914, 918.

3. Implementation Example—Hardware Overview

Figure 10:
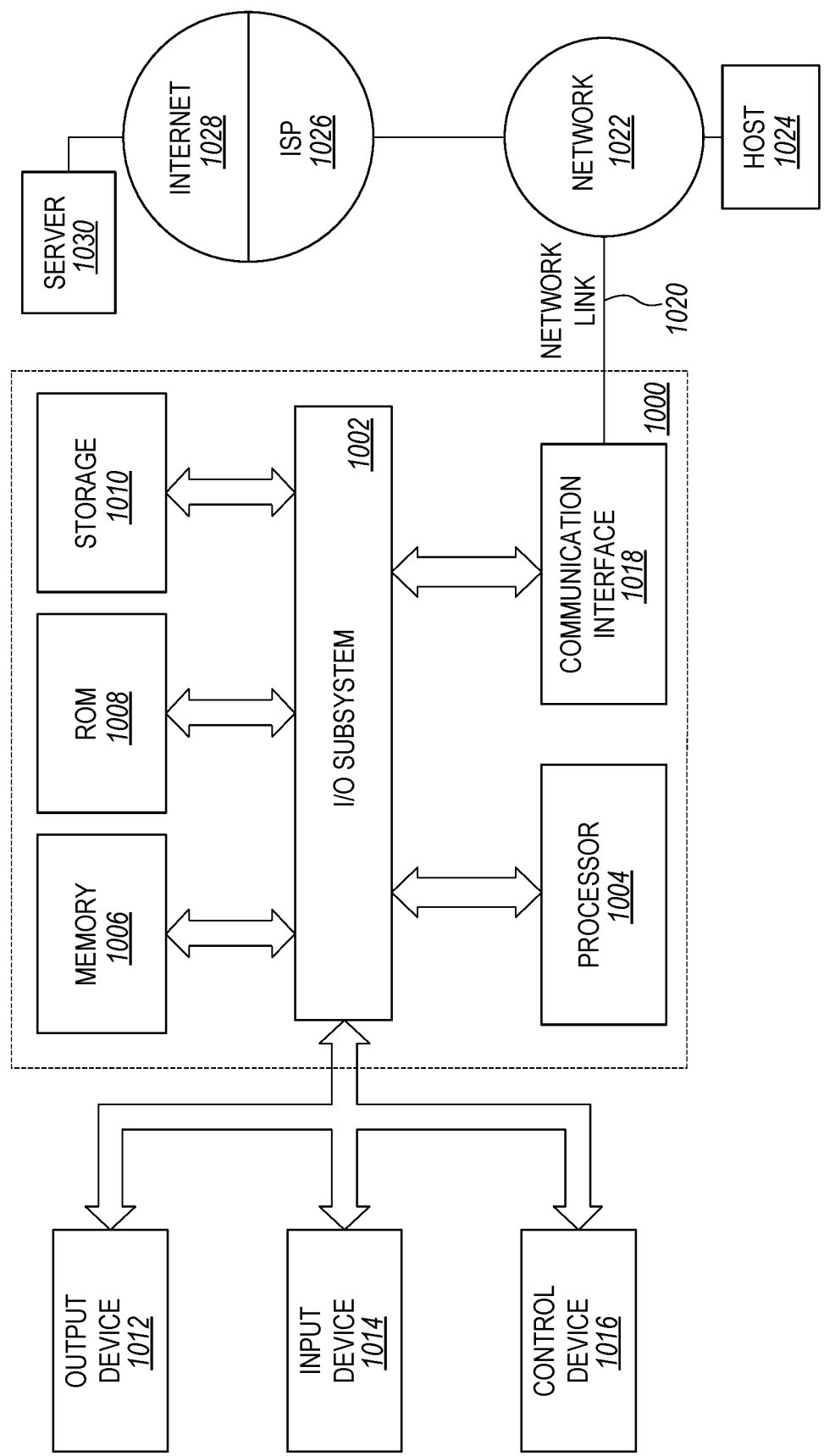
FIG. 10 illustrates a computer system with which one embodiment could be implemented.

FIG. 10 is a block diagram that illustrates an example computer system with which an embodiment may be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which may include a bus and/or other communication mechanism(s) for communicating information and/or instructions between the components of the computer system 1000 over electronic signal paths. The I/O subsystem 1002 may include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 may include, for example, a general-purpose microprocessor or microcontroller and/or a special-purpose microprocessor such as an embedded system or a graphics processing unit (GPU) or a digital signal processor or ARM processor. Processor 1004 may comprise an integrated arithmetic logic unit (ALU) or may be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 may include volatile memory such as various forms of random-access memory (RAM) or other dynamic storage device. Memory 1006 also may be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 may include various forms of programmable ROM (PROM) such as erasable PROM (EPROM) or electrically erasable PROM (EEPROM). A unit of persistent storage 1010 may include various forms of non-volatile RAM (NVRAM), such as FLASH memory, or solid-state storage, magnetic disk or optical disk such as CD-ROM or DVD-ROM and may be coupled to I/O subsystem 1002 for storing information and instructions. Storage 1010 is an example of a non-transitory computer-readable medium that may be used to store instructions and data which when executed by the processor 1004 cause performing computer-implemented methods to execute the techniques herein.

The instructions in memory 1006, ROM 1008 or storage 1010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1000 may be coupled via I/O subsystem 1002 to at least one output device 1012. In one embodiment, output device 1012 is a digital computer display. Examples of a display that may be used in various embodiments include a touch screen display or a light-emitting diode (LED) display or a liquid crystal display (LCD) or an e-paper display. Computer system 1000 may include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which may perform cursor control or other automated control functions such as navigation in a graphical interface on a display screen, alternatively or in addition to input functions. Control device 1016 may be a touchpad, a mouse, a trackball, or cursor direction keys for communicating direction information and command selections to processor 1004 and for controlling cursor movement on display 1012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 may include a combination of multiple different input devices, such as a video camera and a depth sensor.

In another embodiment, computer system 1000 may comprise an internet of things (IoT) device in which one or more of the output device 1012, input device 1014, and control device 1016 are omitted. Or, in such an embodiment, the input device 1014 may comprise one or more cameras, motion detectors, thermometers, microphones, seismic detectors, other sensors or detectors, measurement devices or encoders and the output device 1012 may comprise a special-purpose display such as a single-line LED or LCD display, one or more indicators, a display panel, a meter, a valve, a solenoid, an actuator or a servo.

When computer system 1000 is a mobile computing device, input device 1014 may comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 may include hardware, software, firmware and interfaces for generating position reporting packets, notifications, pulse or heartbeat signals, or other recurring data transmissions that specify a position of the computer system 1000, alone or in combination with other application-specific data, directed toward host 1024 or server 1030.

Computer system 1000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions may be read into main memory 1006 from another storage medium, such as storage 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media may be involved in carrying at least one sequence of at least one instruction to processor 1004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to a format that can be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 may optionally be stored on storage 1010 either before or after execution by processor 1004.

Computer system 1000 also includes a communication interface 1018 coupled to bus 1002. Communication interface 1018 provides a two-way data communication coupling to network link(s) 1020 that are directly or indirectly connected to at least one communication networks, such as a network 1022 or a public or private cloud on the Internet. For example, communication interface 1018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a local area network (LAN), wide-area network (WAN), campus network, internetwork or any combination thereof. Communication interface 1018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic or optical signals over signal paths that carry digital data streams representing various types of information.

Network link 1020 typically provides electrical, electromagnetic, or optical data communication directly or through at least one network to other data devices, using, for example, satellite, cellular, Wi-Fi, or BLUETOOTH technology. For example, network link 1020 may provide a connection through a network 1022 to a host computer 1024.

Furthermore, network link 1020 may provide a connection through network 1022 or to other computing devices via internetworking devices and/or computers that are operated by an Internet Service Provider (ISP) 1026. ISP 1026 provides data communication services through a world-wide packet data communication network represented as internet 1028. A server computer 1030 may be coupled to internet 1028. Server 1030 broadly represents any computer, data center, virtual machine or virtual computing instance with or without a hypervisor, or computer executing a containerized program system such as DOCKER or KUBERNETES. Server 1030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1000 and server 1030 may form elements of a distributed computing system that includes other computers, a processing cluster, server farm or other organization of computers that cooperate to perform tasks or execute applications or services. Server 1030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1030 may comprise a web application server that hosts a presentation layer, application layer and data storage layer such as a relational database system using structured query language (SQL) or no SQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage 1010, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1004. While each processor 1004 or core of the processor executes a single task at a time, computer system 1000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a server computer executing an e-procurement platform instance coupled to a relational database, the method comprising:
   receiving from a user computer via a network one or more requests to create one or more subforms that are associated with an expense trip preapproval form digitally stored in the relational database, each of the subforms being associated with a different type of a travel expense item;
   in a particular subform among the one or more subforms, receiving input from the user computer, in a graphical user interface having a plurality of fields, specifying a plurality of input values in the plurality of fields for attributes of the particular subform, the plurality of input values collectively specifying the travel expense item;
   locking the plurality of fields and displaying an interstitial visualization to block subsequent input;
   programmatically transmitting, to a price modeling server, a query comprising the plurality of input values and requesting a cost value for a travel item corresponding to the plurality of input values, and receiving in response to the query a predicted cost of the travel expense item;
   automatically updating the particular subform to display the predicted cost in the particular subform and to populate the predicted cost into a total cost attribute of the particular subform, the total cost attribute being separate from the display of the predicted cost;
   receiving, from the user computer, an updated value of the total cost attribute and updating the total cost attribute to specify the updated value;
   in an approval graphical user interface comprising an approval view that shows values of the particular subform in a particular region of the approval graphical user interface, in response to determining that the updated value of the total cost attribute is different than the predicted cost, automatically generating and displaying a notification, in the particular region, specifying that the updated value is different and specifying an amount of difference between the updated value of the total cost attribute and the predicted cost;
   programmatically associating the expense trip preapproval form with a draft trip report by creating rows in tables of the relational database to represent the draft trip report with column attributes that point to another row of another table that represents the expense preapproval form;
   automatically associating one or more expense lines of the draft trip report with the plurality of input values for attributes of the particular subform using column attributes of tables of the relational database.

2. The method of claim 1, the travel expense item being any of a flight, a hotel booking, a car rental booking, a train or rail booking, a bus or coach booking, allowable meal expenses, or any other associated expenses such as admission to paid events.

3. The method of claim 2, further comprising executing wherein programmatically transmitting the query to the price modeling server is executed only after:
   receiving from the user computer in a graphical user interface showing the particular subform,
      a departure value and a destination value in departure and destination fields;
      in date picker fields programmed as required fields, start and end dates of a proposed trip segment;
      in a trip type radio button, a selection of a trip segment type;
      wherein the departure and destination fields, date picker fields, and trip type radio button are programmed as required fields;
   wherein locking the plurality of fields and displaying an interstitial visualization to block subsequent input comprises locking all the required fields to block subsequent input; and
   wherein the interstitial visualization is configured to cue the user computer that data is being processed.

4. The method of claim 1, further comprising receiving from the user computer via the network at least two requests to create at least a first subform and a second subform that are associated with the expense trip preapproval form, each of the first subform and the second subform being associated with a different type of a travel expense item;
   in each of the first subform and the second subform, receiving input specifying a plurality of input values for attributes of the particular subform, the plurality of input values collectively specifying two respective travel expense items;
   using the plurality of input values of each of the first subform and the second subform, programmatically calling the price modeling server and receiving, in response to the calling, predicted costs of the travel expense items of each of the first subform and second subform;
   automatically updating the first subform and the second subform to display the predicted costs and to populate the predicted costs into a first total cost attribute of the first subform and a second total cost attribute of the second subform;
   receiving, from the user computer, an updated value of the first total cost attribute and updating the first total cost attribute to specify the updated value;
   in the approval graphical user interface comprising an approval view that shows values of the first subform in a first region of the approval graphical user interface and the second subform in a second region of the approval graphical user interface, in response to determining that the updated value of the first total cost attribute is different than a particular predicted cost in the first subform, automatically generating and displaying a first notification associated with the first subform in the first region and specifying that the updated value is different and specifying an amount of difference between the updated value of the total cost attribute and the particular predicted cost;
   in the approval view, generating and displaying a second notification associated with the second subform in the second region and specifying that the second total cost attribute is the same as a second particular predicted cost of the second subform.

5. The method of claim 1, the price modeling server comprising digitally stored database records for at least commercial air flight prices and hotel room prices, the price modeling server being programmed to continuously query third-party travel data services and update the database records.

6. The method of claim 1, wherein the notification is displayed adjacent to a field displaying the predicted cost in the approval graphical user interface.

7. The method of claim 1, further comprising:
programmatically transmitting, to a price modeling server, in response to receiving a changed input value in a field of the plurality of fields, a second query comprising the changed input value and requesting an updated cost value for the travel item, and receiving in response to the second query an updated predicted cost of the travel expense item; and
automatically updating the particular subform to display the updated predicted cost in the particular subform and to populate the updated predicted cost into the total cost attribute of the particular subform.

8. A computer system executing an e-procurement platform instance coupled to a relational database, comprising:
one or more processors;
one or more non-transitory computer-readable media coupled to the one or more processors and storing one or more sequences of stored program instructions which when executed using the one or more processors cause the one or more processors to execute:
receiving from a user computer via a network one or more requests to create one or more subforms that are associated with a digitally stored expense trip preapproval form digitally stored in the relational database, each of the subforms being associated with a different type of a travel expense item;
in a particular subform among the one or more subforms, receiving input from the user computer, in a graphical user interface having a plurality of fields, specifying a plurality of input values in the plurality of fields for attributes of the particular subform, the plurality of input values collectively specifying the travel expense item;
locking the plurality of fields and displaying an interstitial visualization to block subsequent input;
programmatically transmitting, to a price modeling server, a query comprising the plurality of input values and requesting a cost value for a travel item corresponding to the plurality of input values, and receiving in response to the query a predicted cost of the travel expense item;
automatically updating the particular subform to display the predicted cost in the particular subform and to populate the predicted cost into a total cost attribute of the particular subform, the total cost attribute being separate from the display of the predicted cost;
receiving, from the user computer, an updated value of the total cost attribute and updating the total cost attribute to specify the updated value;
in an approval graphical user interface comprising an approval view that shows values of the particular subform in a particular region of the approval graphical user interface, in response to determining that the updated value of the total cost attribute is different than the predicted cost, automatically generating and displaying a notification, in the particular region, specifying that the updated value is different and specifying an amount of difference between the updated value of the total cost attribute and the predicted cost;
programmatically associating the expense trip preapproval form with a draft trip report by creating rows in tables of the relational database to represent the draft trip report with column attributes that point to another row of another table that represents the expense preapproval form;
automatically associating one or more expense lines of the draft trip report with the plurality of input values for attributes of the particular subform using column attributes of tables of the relational database.

9. The computer system of claim 8, the travel expense item being any of a flight, a hotel booking, a car rental booking, a train or rail booking, a bus or coach booking, allowable meal expenses, or any other associated expenses such as admission to paid events.

10. The computer system of claim 9, further comprising sequences of stored program instructions which when executed using the one or more processors cause the one or more processors to execute programmatically transmitting the query to the price modeling server only after determining that a set of the plurality of input values corresponds to a set of prequalifying conditions of the particular subform and:
receiving from the user computer in a graphical user interface showing the particular subform,
a departure value and a destination value in departure and destination fields;
in date picker fields programmed as required fields, start and end dates of a proposed trip segment;
in a trip type radio button, a selection of a trip segment type;
wherein the departure and destination fields, date picker fields, and trip type radio button are programmed as required fields;
wherein locking the plurality of fields and displaying an interstitial visualization to block subsequent input comprises locking all the required fields to block subsequent input; and
wherein the interstitial visualization is configured to cue the user computer that data is being processed.

11. The computer system of claim 8, further comprising sequences of stored program instructions which when executed using the one or more processors cause the one or more processors to execute receiving from the user computer via the network at least two requests to create at least a first subform and a second subform that are associated with the expense trip preapproval form, each of the first subform and the second subform being associated with a different type of a travel expense item;
in each of the first subform and the second subform, receiving input specifying a plurality of input values for attributes of the particular subform, the plurality of input values collectively specifying two respective travel expense items;
using the plurality of input values of each of the first subform and the second subform, programmatically calling the price modeling server and receiving, in response to the calling, predicted costs of the travel expense items of each of the first subform and second subform;
automatically updating the first subform and the second subform to display the predicted costs and to populate the predicted costs into a first total cost attribute of the first subform and a second total cost attribute of the second subform;

receiving, from the user computer, an updated value of the first total cost attribute and updating the first total cost attribute to specify the updated value;

in the approval graphical user interface comprising an approval view that shows values of the first subform in a first region of the approval graphical user interface and the second subform in a second region of the approval graphical user interface, in response to determining that the updated value of the first total cost attribute is different than a particular predicted cost in the first subform, automatically generating and displaying a first notification associated with the first subform in the first region and specifying that the updated value is different and specifying an amount of difference between the updated value of the total cost attribute and the particular predicted cost;

in the approval view, generating and displaying a second notification associated with the second subform in the second region and specifying that the second total cost attribute is the same as a second particular predicted cost of the second subform.

12. The computer system of claim 8, the price modeling server comprising digitally stored database records for at least commercial air flight prices and hotel room prices, the price modeling server being programmed to continuously query third-party travel data services and update the database records.

13. The computer system of claim 8, wherein the notification is displayed adjacent to a field displaying the predicted cost in the approval graphical user interface.

14. The computer system of claim 8, further comprising further comprising sequences of stored program instructions which when executed using the one or more processors cause the one or more processors to execute programmatically transmitting, to a price modeling server, in response to receiving a changed input value in a field of the plurality of fields, a second query comprising the changed input value and requesting an updated cost value for the travel item, and receiving in response to the second query an updated predicted cost of the travel expense item; and automatically updating the particular subform to display the updated predicted cost in the particular subform and to populate the updated predicted cost into the total cost attribute of the particular subform.

* * * * *